(12) United States Patent
Howard

(10) Patent No.: US 7,625,475 B2
(45) Date of Patent: Dec. 1, 2009

(54) NANOTUBE FLUID PUMP

(75) Inventor: Robert J. Howard, Clifton, VA (US)

(73) Assignee: Lockheed Martin Corporation, Bethesda, MA (US)

( * ) Notice: Subject to any disclaimer, the term of this patent is extended or adjusted under 35 U.S.C. 154(b) by 830 days.

(21) Appl. No.: 10/929,740

(22) Filed: Aug. 30, 2004

(65) Prior Publication Data

US 2006/0042947 A1   Mar. 2, 2006

(51) Int. Cl.
F04B 19/20 (2006.01)
B82B 1/00 (2006.01)

(52) U.S. Cl. .................. 204/451; 204/601; 977/742; 977/750; 977/902; 977/962; 417/50

(58) Field of Classification Search .......... 204/600, 204/451, 601; 977/700–832, 902–963; 435/287.2; 417/48, 49, 50
See application file for complete search history.

(56) References Cited

U.S. PATENT DOCUMENTS

| | | | | |
|---|---|---|---|---|
| 5,145,567 A | * | 9/1992 | Hsieh et al. | 204/452 |
| 5,858,644 A | * | 1/1999 | Chen | 435/4 |
| 6,718,834 B1 | * | 4/2004 | Sood et al. | 73/861.08 |
| 7,302,845 B2 | * | 12/2007 | Sood et al. | 73/204.26 |
| 2004/0113980 A1 | * | 6/2004 | Lewis et al. | 347/54 |

OTHER PUBLICATIONS

Miller, S. A., et al. "Electroosmotic flow in template-prepared carbon nanotube membranes", Journal of the American Chemical Society, vol. 123, No. 49, p. 12335-12342.*
Carbon Nanotube Flow Sensors, Shankar Ghost, A. K. Sood, N.Kumar, Science Feb. 14, 2003; vol. 299, p. 1042-1044.
Flow-induced Voltage and Current Generation in Carbon Nanotubes, S. Gosh, A.K. Sood, S. Ramaswamy and N. Kumar, Department of Physics, Indian Institute of Science, Bangalore—560 012, India and Raman Research Institute, C.V. Raman Avenue, Bangalore—560 080, India.

* cited by examiner

*Primary Examiner*—Nam X Nguyen
*Assistant Examiner*—J. Christopher Ball
(74) *Attorney, Agent, or Firm*—Schwegman, Lundberg & Woessner, P.A.

(57) ABSTRACT

A microfluidic pump has an outer housing such as a capillary tube, a nanotube, and an ionic fluid or alcohol. The nanotube is placed inside the capillary tube, and the capillary tube is filled with the ionic fluid or alcohol. A voltage source is connected to the nanotube, and upon application of a voltage to the nanotube, the ionic fluid or alcohol is pumped through the capillary tube.

19 Claims, 1 Drawing Sheet

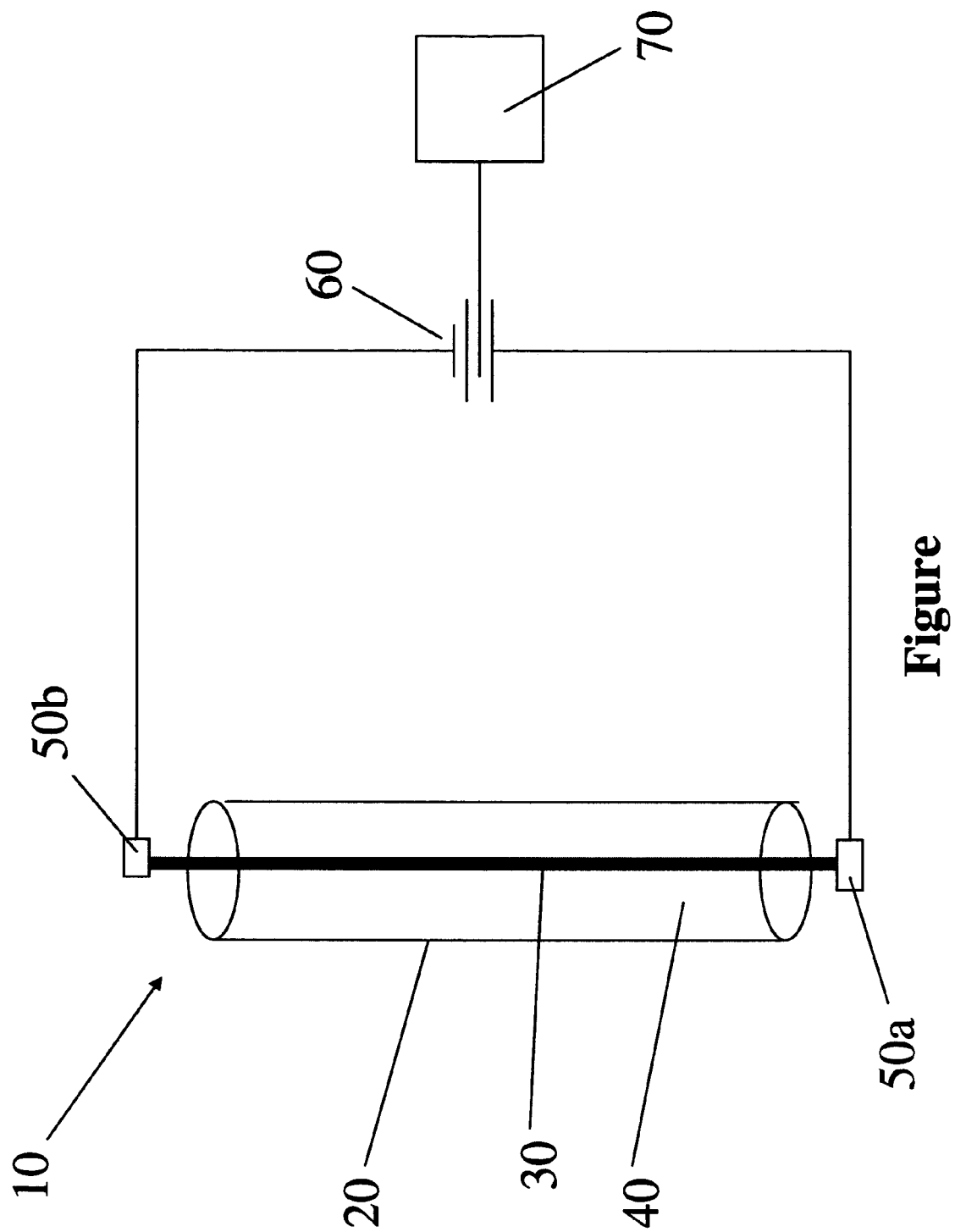

NANOTUBE FLUID PUMP

FIELD OF THE INVENTION

The present invention relates to nanotechnology, and in particular, nanotubes, and more particularly, the use of nanotubes as microfluidic pumps.

BACKGROUND OF THE INVENTION

Nanotechnology refers to processes, products, composites and other technologies that employ dimensions on the order of magnitude of $10^{-9}$ meters. Nanostructured materials exhibit unique properties that permit the creation of new, high-performance materials. Incorporating nanotechnology into materials and products adds value to these traditional materials and products by enhancing their mechanical strength, their superconductivity, and/or their ability to incorporate and efficiently deliver active substances into biological, space based, and other systems.

A nanostructure that has received a good deal of attention in recent years, and which is now commercially available, is the nanotube. A nanotube is made by winding single sheets of graphite with honeycomb structures into very long and thin tubes that have stable, strong, and flexible structures. The specific methods for producing such nanotubes include laser ablation of graphite and vapor-phase growth from hydrocarbon feed stock. These manufacturing processes normally produce both single walled and multi-walled nanotubes in mats or bundles of nanotubes.

Microfluidics, which is often used in conjunction with nanotubes and other nanotechnologies, presently deals with the functions and properties of fluids on the order of $10^{-4}$ to $10^{-3}$ meters. As technology in this area advances, the magnitudes of microfluids may become even smaller. Microfluidics is useful, among other things, for compact, self-contained, environmentally friendly chemical synthesis and analysis systems.

It has recently been reported that carbon nanotubes, when placed into a capillary filled with an ionic fluid or an alcohol, will generate a voltage when the fluid flows at a sufficient velocity. See *Science*, "Carbon Nanotube Flow Sensors," Ghosh et. al., Feb. 14, 2003, Vol. 299, p. 1042. It has been suggested that such an arrangement could be used for flow sensors in microfluidic and other nanotechnology applications, and possibly even for the production of electric power.

SUMMARY OF AN EMBODIMENT OF THE PRESENT INVENTION

In one or more embodiments, the present invention is a microfluidic pump made out of a housing such as a capillary tube with an ionic fluid or alcohol therein and a nanotube disposed within the capillary tube. A voltage source is connected to and supplies a voltage to the nanotube. Upon application of a voltage to the nanotube, the ionic fluid or alcohol flows in connection with the induced current flow in the nanotube. Consequently, embodiments of the present invention satisfy a need for simple and reliable pumps for microfluidic applications.

It is therefore an object of one or more embodiments of the present invention to pump fluids in a microfluidic environment using nanotubes.

BRIEF DESCRIPTION OF THE DRAWING

The FIGURE is a diagram of an embodiment of a nanotube fluid pump of the present invention.

DETAILED DESCRIPTION OF THE PREFERRED EMBODIMENTS, INCLUDING THE BEST MODE

The FIGURE illustrates an embodiment of a single walled nanotube fluid pump 10 of the present invention. While a multiwalled nanotube could also be used in connection with the present invention, the pumping action produced by a multiwalled nanotube may not be as great as that of a single walled nanotube (possibly because the current flow is not concentrated in close proximity to the fluid as in the single walled nanotube). The pump 10 has an outer housing such as a capillary tube 20. Placed within the capillary tube 20 is a single walled nanotube (SWNT) 30. The capillary tube 20 also has within it an ionic fluid 40. The ionic fluid 40 fills the capillary tube and surrounds and permeates the SWNT 30. The SWNT 30 has electric contacts 50a and 50b connected to a voltage source 60 that induces a current flow in the SWNT 30. The voltage source may be connected to a microprocessor 70 that controls the level of voltage applied to the SWNT 30.

When a voltage is applied to the terminals 50a and 50b, a current is induced in the single walled nanotube 30, and the ionic fluid begins to flow in the capillary tube 20. While not being bound by theory, it is believed that the electrostatic attraction between the electrons of the current flow and the positive ions in the ionic fluid causes a flow in the ionic fluid surrounding the SWNT 30. Simply put, the current flow drags the fluid along by the positive ions in the fluid, which in turn pull along any negative ions bound to the positive ions. The result is a flow of the ionic fluid commensurate with the flow of the current. The flow is greatest in a boundary layer of fluid 40 surrounding the SWNT 30. The capillary tube, single walled nanotube, and voltage source therefore function as a microfluidic pump as they cause the flow of the ionic fluid when a voltage is applied. For most efficient pumping, the capillary tube 20 should have an inside diameter that is only slightly greater than the boundary layer of ionic fluid 40 around the SWNT 30 (on the order of $10^{-3}$ to $10^{-6}$ meters). In the embodiment of FIG. 1, it is expected that a voltage of about 1 to 3 millivolts will induce a flow of between 10 micrometers per second and 1 centimeter per second.

As an example, a typical single walled nanotube that can be used in the present invention may be made out of a graphite based carbon by laser ablation, may have an average diameter of 1.5 nm, and may come in bundles that are about a 10 millimeters in length, 0.2 millimeters in thickness, and 2 millimeters in width. The resistivity of such a SWNT is on the order of 0.02 ohm-meters. Ionic fluids that can be used in connection with the present invention include hydrochloric acid (HCl) (e.g. 0.6 N), water, and salt water. Additionally, an alcohol may be used in lieu of an ionic fluid in the capillary tube.

The single walled nanotube fluidic pump 10 of the present invention has several applications. For example, one benefit of nanotechnology is the ability to detect chemical toxins literally on a molecule by molecule basis. The microfluidic pump of the present invention would be very useful in moving dielectric fluids in connection with the detection of such miniscule quantities of chemicals. Also, the microfluidic pump may be used in the synthesis and manufacture of microquantities of chemicals. The synthesis of chemicals in microquantities has many cost, distribution, environmental and safety benefits.

While the invention has been described in its preferred and other embodiments, it is to be understood that the words used are words of description rather than limitation and that changes may be made within the purview of the appended claims without departing from the true scope and spirit of the invention in its broader aspects.

The invention claimed is:

1. A microfluidic pump comprising:
   a housing comprising a first open end and a second open end;
   a single walled nanotube, including two or more electric contacts, positioned within said housing, wherein the single walled nanotube is not part of a membrane;
   an ionic fluid or alcohol contained within said housing; and
   a voltage source directly connected to said two or more electric contacts on said single walled nanotube;
   wherein upon application of a voltage to said two or more electric contacts on said single walled nanotube, a current flows through said single walled nanotube, thereby inducing a uni-directional, non-osmotic flow of said ionic fluid or alcohol in and around said nanotube and causing said ionic fluid to enter said housing via said first open end and exit said housing via said second open end.

2. The microfluidic pump according to claim 1, wherein said housing is a capillary tube.

3. The microfluidic pump according to claim 1, wherein said voltage applied to said nanotube is in the range of 1 to 3 millivolts.

4. The microfluidic pump according to claim 1, further comprising a microprocessor electrically coupled to said pump, wherein said microprocessor controls the voltage applied to said single walled nanotube.

5. The microfluidic pump according to claim 1, wherein said pump is used to sense the presence of chemical compounds.

6. The microfluidic pump according to claim 1, wherein said pump is used to synthesize chemical compounds.

7. The microfluidic pump according to claim 1, wherein said ionic fluid comprises HCl, water, or salt water.

8. The microfluidic fluid pump according to claim 1, wherein said housing is separated from said single walled nanotube by a distance of about $10^{-6}$ to $10^{-4}$ meters.

9. The microfluidic pump according to claim 1, wherein said single walled nanotube comprises a diameter of approximately 1.5 nanometers.

10. The microfluidic pump according to claim 1, wherein said single walled nanotube comprises a bundle of single walled nanotubes, said bundle being approximately 10 millimeters in length, 0.2 millimeters in thickness, and 2 millimeters in width.

11. A microfluidic pump comprising:
    a housing comprising a first open end and a second open end;
    a nanotube, including two or more electric contacts, positioned within said housing, wherein said nanotube is not part of a membrane;
    an ionic fluid or alcohol contained within said housing; and
    a voltage source directly connected to said two or more contacts of said nanotube;
    wherein upon application of a voltage to said two or more contacts of said nanotube, a current flows through said nanotube, thereby inducing a uni-directional, non-osmotic flow of said ionic fluid or alcohol in and around said nanotube and causing said ionic fluid or alcohol to enter said housing via said first open end and exit said housing via said second open end.

12. The microfluidic pump according to claim 11, wherein said housing is a capillary tube.

13. The microfluidic pump according to claim 11, wherein said nanotube is multiwalled.

14. A process to pump microfluids, comprising the steps of:
    applying a voltage to a microfluidic pump, said microfluidic pump comprising:
      a housing comprising a first open end and a second open end;
      a nanotube, including two or more electric contacts, positioned within said housing, wherein the nanotube is not part of a membrane; and
      an ionic fluid or alcohol contained within said housing;
      wherein upon the application of a voltage to the electric contacts of the nanotube, the microfluids flow in a uni-directional, non-osmotic manner into said housing via said first open end and flow in a uni-directional, non-osmotic manner out of said housing via said second open end.

15. The process to pump microfluids according to claim 14, wherein said housing is a capillary tube.

16. The process to pump microfluids according to claim 14, wherein said voltage is in the range of 1 to 3 millivolts.

17. The process to pump microfluids according to claim 14, wherein said voltage is controlled by a microprocessor.

18. The process to pump microfluids according to claim 14, further comprising the step of pumping said ionic fluid or alcohol through a detection apparatus and detecting a chemical compound in said microfluid.

19. The process to pump microfluids according to claim 14, further comprising the step of pumping said ionic fluid or alcohol through an apparatus used in connection with the synthesis of chemical compounds.

* * * * *

UNITED STATES PATENT AND TRADEMARK OFFICE
CERTIFICATE OF CORRECTION

PATENT NO. : 7,625,475 B2
APPLICATION NO. : 10/929740
DATED : December 1, 2009
INVENTOR(S) : Robert J. Howard It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1261 days.

Signed and Sealed this

Second Day of November, 2010

David J. Kappos
*Director of the United States Patent and Trademark Office*